(12) United States Patent
Johnson et al.

(10) Patent No.: US 7,531,743 B2
(45) Date of Patent: May 12, 2009

(54) ELECTRICAL BOX MOUNTING PLATE WITH ADJUSTABLE RING

(75) Inventors: Steven J. Johnson, Galien, MI (US); Krzysztof W. Korcz, Granger, IN (US)

(73) Assignee: Hubbell Incorporated, Orange, CT (US)

( * ) Notice: Subject to any disclaimer, the term of this patent is extended or adjusted under 35 U.S.C. 154(b) by 21 days.

(21) Appl. No.: 11/648,907

(22) Filed: Jan. 3, 2007

(65) Prior Publication Data

US 2008/0156513 A1 Jul. 3, 2008

(51) Int. Cl.
H01H 9/02 (2006.01)

(52) U.S. Cl. .............. 174/57; 174/53; 174/58; 174/66; 220/3.2; 220/3.3; 220/241

(58) Field of Classification Search ........... 174/50, 174/53, 57, 58, 480, 481, 496, 66, 67, 135; 220/3.2–3.9, 4.02, 241, 242; 248/906, 343; 33/528, DIG. 10
See application file for complete search history.

(56) References Cited

U.S. PATENT DOCUMENTS

| | | | |
|---|---|---|---|
| 740,663 A | 10/1903 | Krantz | |
| 915,381 A | 3/1909 | Pullets | |
| 1,400,824 A | 12/1921 | Knoderer | |
| 1,875,101 A | 8/1932 | Morrell | |
| 2,378,861 A | 6/1945 | Peevey | |
| 2,707,221 A | 4/1955 | Frank | |
| 2,886,630 A | 5/1959 | Gill | |
| 2,989,206 A * | 6/1961 | McAfee | 220/3.7 |
| 4,266,683 A | 5/1981 | Sellinger | |
| 4,496,067 A | 1/1985 | Benscoter | |
| 4,634,015 A * | 1/1987 | Taylor | 220/3.7 |
| 4,922,056 A | 5/1990 | Larsson | |
| 4,947,281 A | 8/1990 | Boteler | |
| 4,979,634 A | 12/1990 | Begley | |
| 4,988,832 A | 1/1991 | Shotey | |
| 5,010,211 A | 4/1991 | Bartee | |
| 5,012,043 A | 4/1991 | Seymour | |
| 5,042,673 A | 8/1991 | McShane | |
| 5,045,640 A | 9/1991 | Riceman | |
| 5,117,996 A | 6/1992 | McShane | |
| 5,124,876 A | 6/1992 | Misencik et al. | |
| 5,135,411 A | 8/1992 | Wiley et al. | |
| 5,218,169 A | 6/1993 | Riceman | |
| 5,402,902 A | 4/1995 | Bouley | |
| 5,456,373 A | 10/1995 | Ford | |
| 5,931,325 A | 8/1999 | Filipov | |
| 5,965,844 A | 10/1999 | Lippa | |

(Continued)

FOREIGN PATENT DOCUMENTS

CA 1105121 7/1981

*Primary Examiner*—Angel R Estrada
(74) *Attorney, Agent, or Firm*—Garrett V. Davis; Mark S. Bicks; Alfred N. Goodman

(57) ABSTRACT

An electrical box assembly includes an adjustable electrical box cover. The cover includes a base having a central opening and a collar encircling the central opening. A sleeve slides through the collar and is adjusted by a plurality of adjustment screws. In one embodiment, the adjustment screws are positioned within the sleeve and the collar. The sleeve and collar have inwardly extending tabs to receive the adjustment screws allow adjustment of the sleeve with respect to the collar.

36 Claims, 8 Drawing Sheets

U.S. PATENT DOCUMENTS

| | | | |
|---|---|---|---|
| 5,975,323 A * | 11/1999 | Turan | 220/4.02 |
| 6,649,838 B1 | 11/2003 | Lopez, Sr. et al. | |
| 6,820,760 B2 | 11/2004 | Wegner et al. | |
| 6,878,877 B1 | 4/2005 | Cozzi et al. | |
| 6,878,878 B2 | 4/2005 | Westlake | |
| 7,038,131 B1 * | 5/2006 | Gretz | 174/58 |
| 7,259,328 B1 * | 8/2007 | Gretz | 174/57 |
| 7,276,661 B2 * | 10/2007 | Wegner et al. | 174/58 |
| 7,301,099 B1 * | 11/2007 | Korcz et al. | 174/58 |
| 2005/0051354 A1 | 3/2005 | Wegner et al. | |
| 2005/0082079 A1 | 4/2005 | Wegner et al. | |

* cited by examiner

ELECTRICAL BOX MOUNTING PLATE WITH ADJUSTABLE RING

FIELD OF THE INVENTION

The present invention is directed to an adjustable electrical outlet box cover plate having an adjustable mud ring that can be attached to a conventional electrical box. The invention is further directed to an adjustable electrical box cover plate having a movable sleeve for allowing adjustment of the electrical device to compensate for different wall thicknesses to set the electrical device at the desired position in relation to the exterior surface of the wall.

BACKGROUND OF THE INVENTION

Electrical boxes are commonly mounted to a stud or other support structure for supporting an electrical device and enclosing electrical wiring. The electrical boxes are often mounted in a variety of positions and locations in the wall or ceiling. The electrical box is typically attached to the stud or other support structure by nails, screws or other fasteners. In new construction, the electrical box is attached to the building stud with the open front face of the electrical box positioned so that the outer face of the drywall or paneling is essentially flush with the outer edge of the electrical box. In some forms of construction, the stud or other structure does not allow proper orientation of the electrical box so that the open end of the electrical box is recessed with respect to the outer surface of the wall when the wall is installed and finished.

Renovating old construction also can create difficulties in positioning the electrical box with respect to the outer surface of the wall. New wall board or paneling can be applied over existing walls so that the original electrical box is recessed within the wall and is not easily moved or relocated. The recessed electrical box results in the electrical device being recessed with respect to the wall and is not easily accessible.

A number of devices have been proposed providing an adjustable assembly for connecting to an outlet box that can accommodate four different thicknesses of wall structures and the spacing between the outer surface of a wall and an electrical box. One example is disclosed in U.S. Pat. No. 4,634,015 to Taylor which includes a plate and an open collar disposed on the mounting plate about a central opening. A box frame slides within the collar to contact the side walls of the collar. Adjustment screws are mounted in the box to connect the frame to the collar or the mounting plate to move the box outwardly of the collar.

Another example is disclosed in U.S. Pat. No. 5,931,325 to Filipov. This patent discloses an adjustable mud ring for an electrical box having a plate that can be attached to an electrical box and a collar extending outwardly from the plate. A movable sleeve surrounds the collar and is attached to the collar by screws that adjust the position.

Still another example is disclosed in U.S. Pat. No. 6,820,760 to Wegner et al. which discloses an electrical box extension having an extending member for a switch and/or electrical receptacle. The extension member includes fastener brackets and a fastener base bracket. Fasteners extend through the fastener brackets of the base bracket to adjust the relative position of the extending member to the base. Similar adjustable electrical box extensions are disclosed in U.S. Patent Application Publication No. 2005/0051354 and 2005/0082079 to Wegner et al.

Examples of other electrical boxes having an adjustable sleeve or collar to position the electrical device with respect to the electrical box are disclosed in U.S. Pat. No. 915,381 to Pullets, U.S. Pat. No. 740,663 to Krantz, U.S. Pat. No. 1,875,101 to Morrell, and U.S. Pat. No. 2,707,221 to Frank.

While each of the prior devices has been generally suitable for the intended purpose, there is a continuing need in the industry for an improved device for mounting an electrical component to an electrical box.

SUMMARY OF THE INVENTION

The present invention is directed to an adjustable electrical box cover plate for coupling directly to an existing electrical box. The invention is particularly directed to an electrical box having an adjustable assembly for accommodating the depth of the wall structure and the spacing between the outer surface of the wall and the electrical box. The cover plate includes an adjustable mud ring for adjusting the electrical device in a selected position with respect to the face of the wall structure and the electrical box.

Accordingly, one aspect of the invention is to provide an electrical box cover plate for attaching to an electrical box and having a telescoping member for adjusting the position of the electrical device with respect to the electrical box and the outer surface of the wall. The telescoping member also permits the adjustment of the electrical device with respect to the surface of the wall to accommodate walls of varying thickness.

A further feature of the invention is to provide an electrical box cover plate where the cover plate has a central opening and a collar surrounding the opening. A sleeve is slidable within the collar and can move between a retracted position within the electrical box to an extended position.

The electrical box cover plate of the invention includes a base having a central opening and a collar surrounding the opening and having a sliding sleeve within the collar for supporting the electrical device where the sleeve is able to nest within the collar when in a retracted position. The sleeve is movable from a retracted position where the top edge of the sleeve is essentially flush with the top edge of the collar to an extended position outwardly from the collar to accommodate various thicknesses of a wall structure to position the electrical device flush with the outer surface of the wall structure. In one embodiment, the sleeve has an axial length substantially equal to the axial length of the collar.

A further feature of the invention is to provide an electrical box cover plate having a central opening with a collar surrounding the opening and a movable sleeve within the collar where the movable sleeve is selectively adjusted by at least one adjustment screw having one end captured and being axially fixed so that rotation of the screw moves the sleeve axially with respect to the collar. In one embodiment, one end of the adjustment screw is coupled to the collar in a manner to be rotatable while being axially fixed. The adjustment screw is received in a threaded hole in the sleeve so that rotation of the screw moves the sleeve with respect to the collar. In an alternative embodiment, the adjustment screw is coupled to the sleeve to be rotatable while being axially fixed to the sleeve. The adjustment screw is threaded into a threaded hole in the collar so that rotation of the screw adjusts the position of the sleeve with respect to the collar.

The electrical box cover plate and base of the invention is typically made of sheet metal that is stamped and folded into a desired form. In one form of the invention, the base is formed with a central opening having two opposing tabs that are folded perpendicular to the plane of the base to form two opposing walls of the collar. Separate wall members are then attached to the ends of the opposing side walls that are integrally formed with the base plate to define the collar on the base. In one embodiment, a tab extends inwardly from a bottom edge of a wall and lies in a plane parallel to the plane of the base. The tab has a hole for receiving the adjustment screw.

In one form of the invention, the electrical box cover plate includes a central opening with a collar surrounding the opening and has at least one tab extending into the central opening along the plane of the base. The tab can be positioned in a corner of the collar or at a mid point of a side wall.

The movable sleeve is typically formed of metal from a blank that is folded into a rectangular shape. The sleeve can be square, round or any other shape depending on the intended use. In one form of the invention, the top end of the sleeve includes a mounting plate for supporting the electrical device and a tab spaced from the mounting plate. The tab includes a threaded aperture for the adjustment screw so that the head of the adjustment screw is captured between the mounting plate and the tab so that rotation of the adjustment screw moves the sleeve with respect to the base plate. In one embodiment the sleeve has a coupling member for coupling with a ground wire. The ground wire can be connected to the primary ground wire of the electrical cable and/or to the electrical device supported by the mounting plate. The coupling member in one embodiment is a band cut and punched from the wall of the sleeve to form a loop-like member having an opening with a dimension to receive the ground wire. The band can be bent or crimped to securely attach the ground wire to the sleeve. The ground wire provides a positive electrical connection to the sleeve and the electrical device mounted on the sleeve.

These and other aspects of the invention are basically attained by providing an adjustable electrical box cover plate for coupling to an electrical box. The cover plate comprises a planar base plate having an outer face, an inner face and a central opening having a dimension sufficient to receive an electrical device. The base plate is adapted for coupling to the electrical box. A collar surrounds the central opening and extends axially from the outer face of the base plate. The collar has a tab at a bottom edge thereof extending inwardly into the central opening. The tab has an aperture therein for receiving an adjustment screw. A sleeve is slidingly received in the collar and is movable axially within the collar. The sleeve has a tab at a bottom edge with a threaded hole therein and is aligned with the tabs of the collar. The sleeve has a side wall with a coupling member for receiving a ground wire. A threaded screw is received in each threaded hole of the tab of the sleeve. An end is rotatably coupled with and axially fixed with respect to the tab. Rotation of the screw adjusts the sleeve axially with respect to the collar.

The various aspects of the invention are also attained by providing an electrical box cover plate comprising a collar defining a central opening and having a base for coupling to an electrical box and a side wall extending inwardly perpendicular to the base. The base has an aperture for capturing a threaded screw. A sleeve is received in the collar and has a bottom edge and top edge. First and second tabs extend inwardly from the bottom edge and have a threaded aperture to receive the screw. First and second mounting flanges extend inwardly from the top edge for mounting an electrical device.

The various aspects of the invention are further attained by providing an electrical box assembly comprising an electrical box having an open top end and having an inner cavity for receiving electrical wiring and an adjustable cover plate. The adjustable cover plate is coupled to the electrical box and comprises a planar base having an outer face and an inner face. The base has a dimension to cover the open top end of the electrical box. A collar extends from the base in a direction substantially perpendicular to the base and defines a central opening. A tab extends inwardly from a bottom edge of opposite sides of the collar. The tabs have an aperture for capturing a threaded screw. A movable sleeve is axially received in the collar and is axially adjustable from a first position where a bottom edge contacts the tab of the collar and a second extended position. The sleeve includes a tab extending inwardly from a bottom edge of opposite side walls in a position to overlie the aperture in the tab of the collar. The tabs in the sleeve have a threaded hole for receiving an adjusting screw. A mounting flange extends inwardly from a top edge of the opposite side walls and include mounting holes for receiving mounting screws for an electrical device. A coupling member is provided on an inner surface of the sleeve for receiving and capturing a ground wire.

These and other aspects and salient features of the invention will become apparent from the following detailed description of the invention, which taken in conjunction with the annexed drawings, disclose various embodiments of the invention.

BRIEF DESCRIPTION OF THE DRAWINGS

The following is a brief description of the drawings, in which.

DETAILED DESCRIPTION OF THE INVENTION

The present invention is directed to an adjustable electrical box cover plate that can be used to accommodate different wall thicknesses so that the electrical device can be positioned in a desired location. The invention is particularly directed to an electrical box cover plate that can adjust the position of the electrical device with respect to the electrical box and to be flush with the wall surface.

Figure 1:
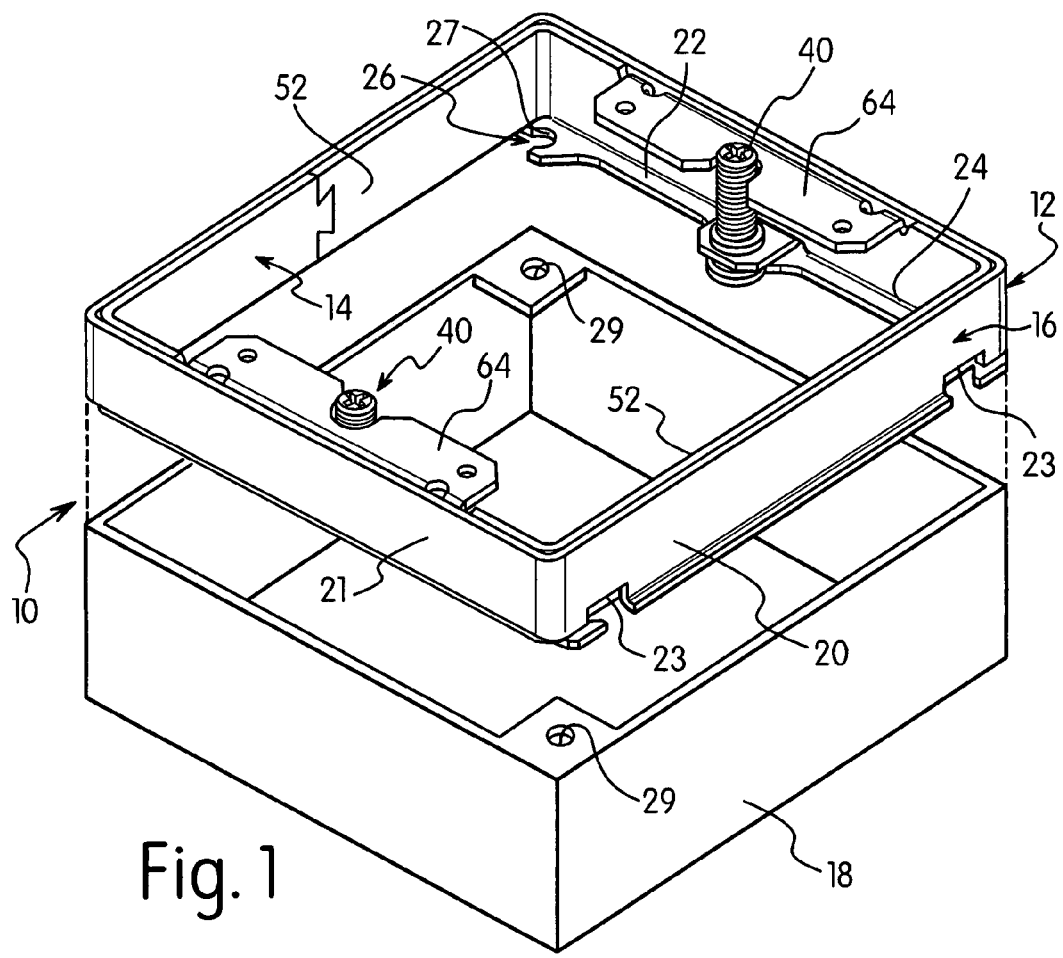
FIG. 1 is a perspective view of the electrical box cover plate in a first embodiment of the invention showing the sleeve recessed in the collar of the base plate.

The cover plate assembly 10 of the invention basically includes a cover plate 12 and a movable sleeve 14 as shown in FIG. 1. The position of the sleeve is axially adjustable with respect to the cover plate 12.

Referring to FIGS. 1-4, a first embodiment of the invention is shown. The cover plate 12 of the cover plate assembly 10 includes collar 16 which has a shape and dimension for connecting to and covering the open end of an electrical box 18. Electrical box 18 is a conventional electrical box for enclosing wiring for the electrical device mounted on the cover plate 12. In the embodiment illustrated, collar 16 has a substantially square configuration and has a dimension to support two electrical devices (not shown). The electrical devices are standard devices such as electrical switches or duplex receptacles that are mounted on and supported by an electrical box.

Collar 16 in the embodiment shown has opposite side walls 20 and adjoining side walls 21. Side walls 20 include a base 22 for mounting on an electrical box. In this embodiment, base 22 extends inwardly from the bottom edge 24 of the respective side wall 20 so that base 22 is positioned within the central opening defined by collar 16. Base 22 has a longitudinal dimension that extends substantially the length of the side wall 20 and has a width to extend into the central opening a distance sufficient to mount to the electrical box without interfering with the opening to the electrical box for accessing the electrical wiring. In the embodiment shown, base 22 has a length to form an end portion that contacts a bottom edge of the adjacent side walls. The end portion or corners of base 22 include a slot 26 for receiving mounting screws to attach base 22 to electrical box 18 in a conventional manner. The shape and size of the base 22 can be selected to correspond to the shape of the electrical box.

Figure 4:
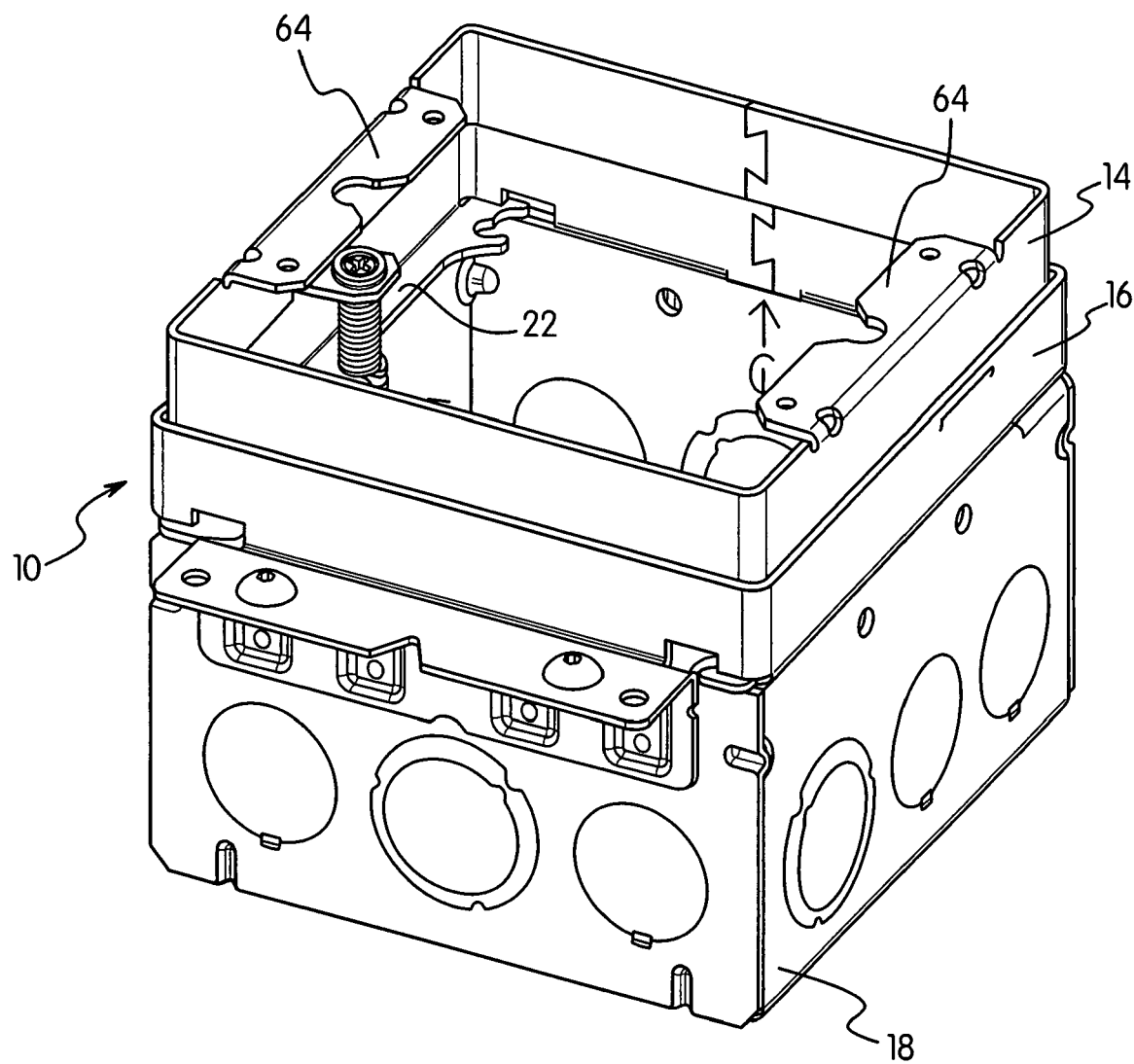
FIG. 4 is a perspective view of the collar and sleeve showing the sleeve in the extended position.

Collar 16 is typically formed of sheet metal that is cut and stamped to form the desired shape. Collar 16 is shaped to form central opening 28. Central opening 28 has a dimension to receive sleeve 14 and to accommodate the electrical device. As shown in FIG. 4, flanges are bent to form bases 22 perpendicular to the plane of collar 16.

Figure 3:
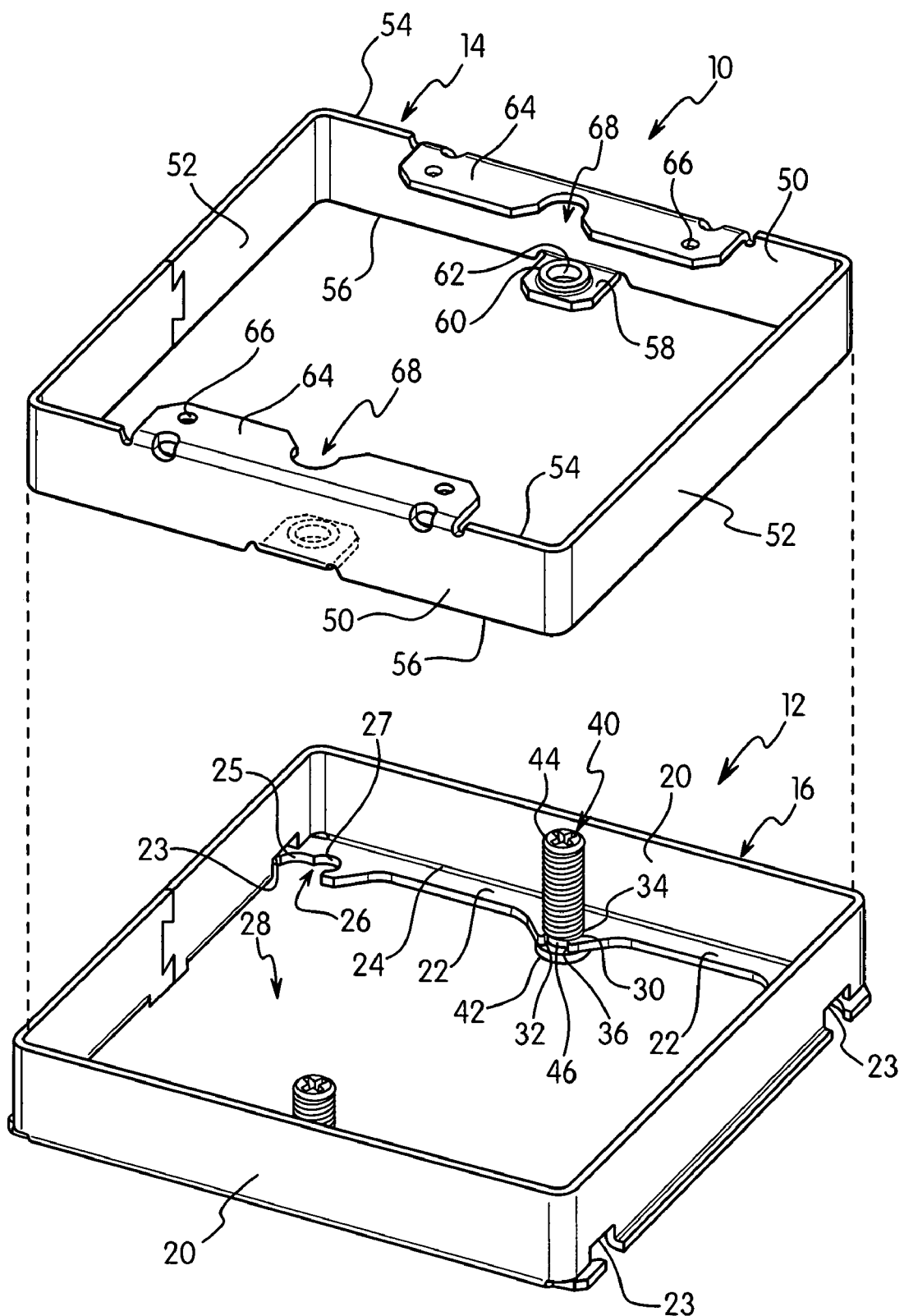
FIG. 3 is an exploded perspective view of the electrical box cover plate of the embodiment of FIG. 1.

Collar 16 includes a pair of tabs 30 that extend inwardly from the opposite side walls 20 into the central opening in an opposing manner. In a preferred embodiment, tabs 30 are integrally formed with the respective base 22 at a mid point between the ends of the respective base 30. As shown in FIG. 3, tabs 30 include a slot 32 defining an aperture 34. Slot 32 has a narrow end portion 36 and a circular portion to capture a threaded screw 40. Screw 40 has a longitudinal dimension with a first end having a head 42 and the second end 44. An annular groove 46 encircles the shaft of screw 40 adjacent head 42 and has a dimension to be received in aperture 34. Screw 40 is captured in aperture 34 of tab 30 to be rotatable while being axially fixed. Head 42 and the opposite axial end of the screw 40 each have a recess for receiving a tool to rotate the screw. Typically the ends of the screw include a slot for mating with the tip of a screw driver, such as a Phillips head screw driver, to enable rotation of the screw from either the top side or the bottom side of the cover plate.

Referring to FIG. 3, sleeve 14 has a configuration complementing the shape and dimension of collar 16 and is able move axially within collar 16. In the embodiment shown, sleeve 14 has a substantially square configuration corresponding to the shape of collar 16. In this embodiment, sleeve 14 has an axial length substantially the same as the axial length of collar 16. Sleeve 14 is formed by a pair of opposing side walls 50 and adjacent side walls 52. Side walls 50 have a top edge 54 and a bottom edge 56.

A tab 58 extends inwardly from the bottom edges 56 of side walls 50 as shown in FIG. 3. Preferably tabs 58 are integrally formed with the respective side wall 50 and extend substantially perpendicular to the plane of side wall 50 and extend in toward the center of central opening 28. Each tab 58 includes a collar 60 having a threaded aperture 62 to receive the threaded screw 40. Each tab 58 is positioned on the respective side wall 50 to be aligned with a respective tab 32 of collar 16 so that collar 16 and sleeve 14 are coupled together by the two screws 40. Screws 40 are captured by tab 32 to be rotatable and axially fixed while being threaded into the threaded aperture of tab 58 so that rotation of the screws moves sleeve 14 with respect to collar 16. Sleeve 14 is movable from a first retracted position shown in FIG. 1 to a second extended position shown in FIGS. 2 and 4. As shown in FIG. 1, when in the retracted position, the top edge of sleeve 14 is substantially aligned with the top edge of collar 16.

Sleeve 14 is provided with mounting flanges 64 that extend inwardly from the top edges 54 of side walls 50. Mounting flanges 64 are oriented perpendicular to the plane of side walls 50 and parallel to the plane of tabs 58. Mounting flanges 64 have internally threaded mounting holes 66 for mounting one or more electrical devices such as a duplex receptacle or a switch. Preferably mounting flanges 64 have a dimension to support the electrical devices and to allow the electrical devices to be received within the central opening of collar 16. In the embodiment shown, mounting flanges 64 have a length to support two electrical devices side by side. Mounting flanges 64 are integrally formed with side walls 50 from a single piece of material and bent inwardly from side walls 50.

Mounting flanges 64 include a central opening 68 between mounting holes 66. In a preferred embodiment, central opening 68 is positioned at a mid portion of the respective side wall 50 and aligned with threaded aperture 62. Central opening 68 has a dimension sufficient to allow a tool, such as a screw driver tip, to be inserted to engage the end of the respective screw 40 to adjust the screw and to position sleeve 14 with respect to collar 16. In the embodiment shown, the central opening is a recessed area. In other embodiments, the central opening can be a hole extending through the mounting flange.

Figure 2:
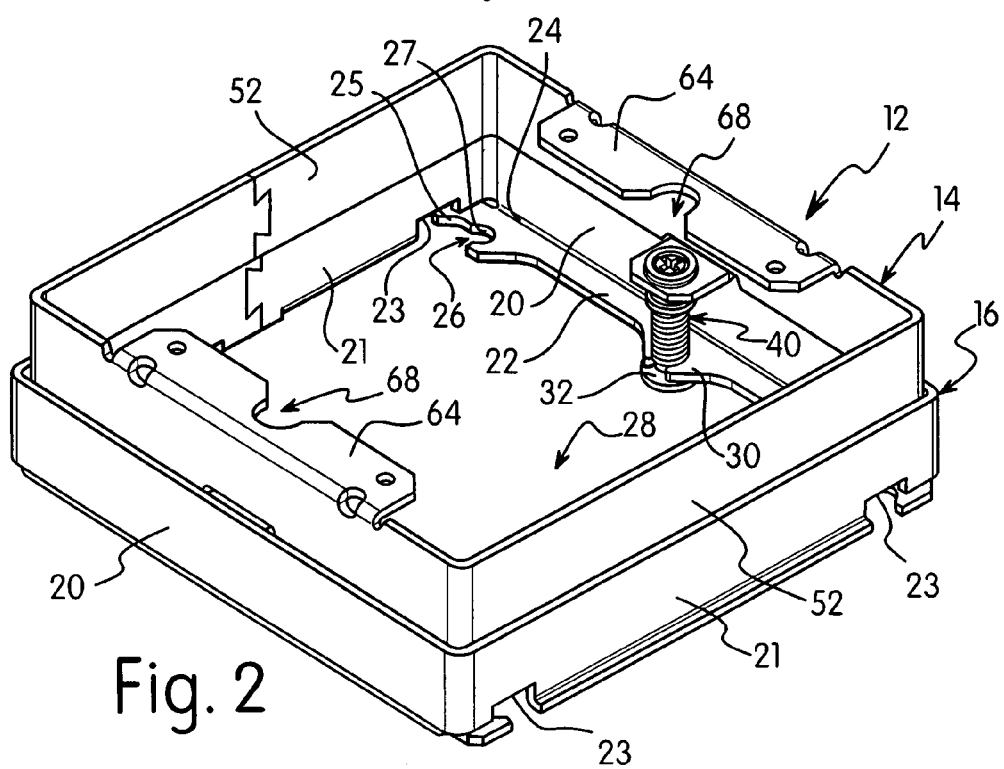
FIG. 2 is a perspective view of the electrical box cover plate of the embodiment of FIG. 1 showing the sleeve in the extended position.

As shown in FIGS. 1-3, side walls 21 are provided with slots 23 or recesses adjacent bases 22 and slots 26 in bases 22. Slots 26 are angled slightly outward and include an arcuate shaped portion 25 aligned with slots 23 and a substantially circular portion 27 for receiving the mounting screw. Preferably, slots 23 have a dimension to accommodate the mounting screws on the electrical box. The screws are threaded into threaded holes 29 in electrical box 18 and the cover plate assembly 12 is positioned over the screws. The cover plate assembly 12 is initially positioned with the screws received in the slots 23 in the side wall and aligned with the arcuate shaped portion 25. The cover plate assembly 12 is then twisted or rotated to align slots 26 with the mounting screws. The mounting screws are then tightened to secure the assembly to the electrical box.

In use, electrical plate 10 is mounted to the open end of electrical box 18 by screws inserted through the slots 26 of collar which are then threaded into the threaded apertures of the electrical box. The electrical box 18 is mounted to a wall stud or other support by standard fasteners as known in the construction art. The desired electrical device is then attached to the mounting flanges 64 of sleeve 14 and connected to the wires contained in the electrical box. A wall surface such as standard wall board is attached to the wall stud and provided with an opening to the electrical box 18. The adjusting screws 40 are then rotated to adjust the position of sleeve 14 and the electrical device with respect to the electrical box so that the top edge of sleeve 14 is substantially flush with the outer surface of the wall and the electrical device is positioned at a desired location with respect to the face of the wall.

Referring to FIGS. 5-12, a second embodiment of the cover plate assembly 72 of the invention is shown. Cover plate assembly 72 is similar to the cover plate of the embodiment of FIGS. 1-4 so that the same elements are identified by the same reference numbers with the addition of a prime. As in the previous embodiment, cover plate assembly 72 includes a collar 74 and a sleeve 76. Collar 74 is similar to the collar of the previous embodiment and includes a base with side walls 78 and end walls 80. Side walls 78 support the base which extends into the central opening of the collar.

Figure 5:
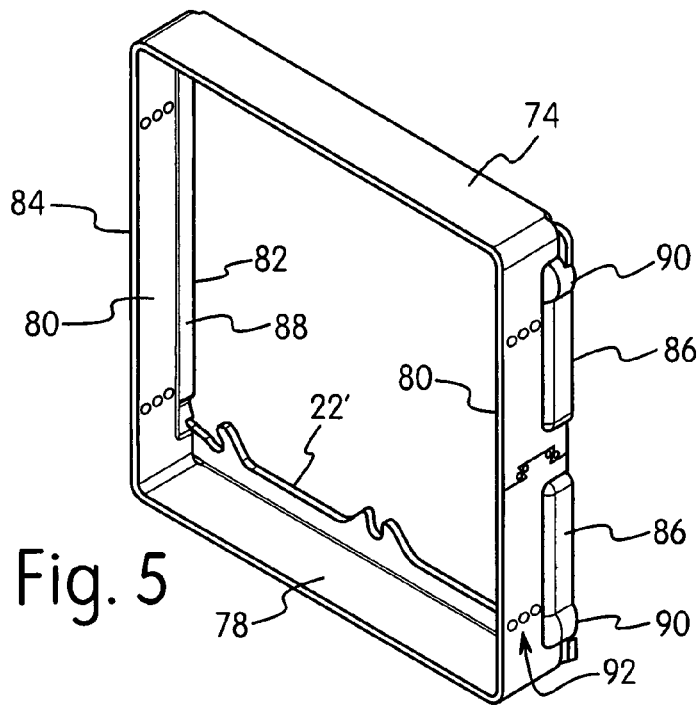
FIG. 5 is a perspective view of the collar in a second embodiment of the invention.
Figure 6:
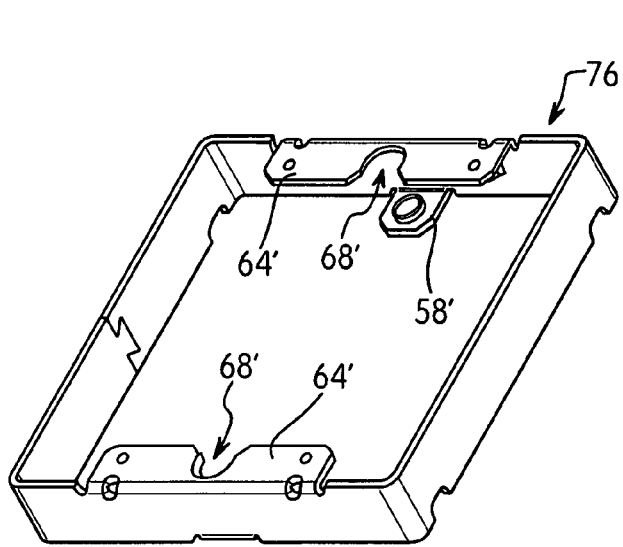
FIG. 6 is a perspective view of the sleeve of the embodiment of FIG. 5.

End walls 80 are substantially adjacent side walls 78 and are substantially parallel to each other as shown in FIG. 5. End walls 80 have a bottom edge 82 and a top edge 84. The bottom edge 82 is embossed to form a rib portion 86 that extends outwardly from the central opening to form a recessed area 88 on the inner surface of the end walls 80. Recessed area 88 and the rib 86 have a longitudinal dimension with opposite ends proximate the corners of collar 74. As shown in FIG. 5, the ends of the rib 86 are formed with a rounded portion 90 that extends outwardly from the rib 86 and has a substantially semi circular shape. The rounded portion 90 and the recessed area 88 of end walls 80 have a dimension to receive the mounting screws in the outside corners of the electrical box. In this manner, the assembly 72 is positioned over the mounting screws with the mounting screws received in the rounded portion 90. The assembly 72 is rotated slightly to insert the mounting screws into the slots 26'. The recessed area 88 also provides a reduced surface area on the inner surface of the collar that contacts the sleeve. By reducing the surface area that contacts the sleeve, the sleeve has a lower tendency to bind so that adjustment of the sleeve with respect to the collar can be easily made.

Figure 9:
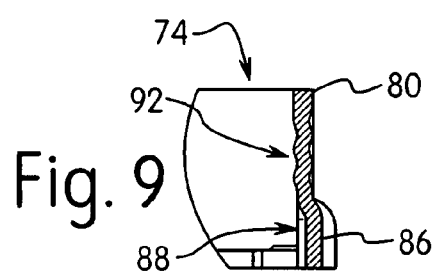
FIG. 9 is a cross sectional view of the embossed portion of the collar.
Figure 10:
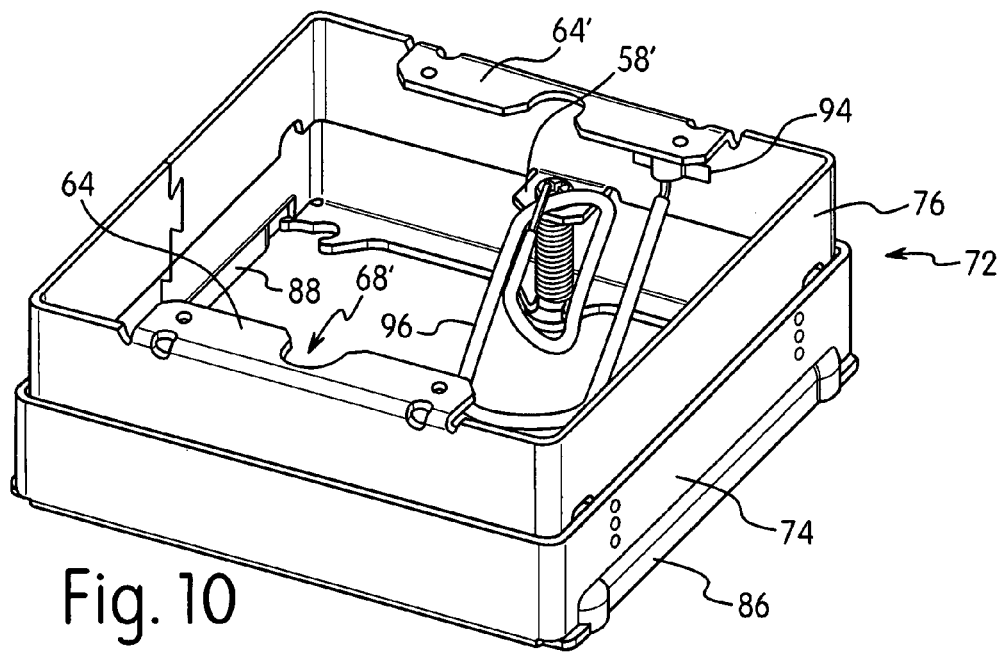
FIG. 10 is a perspective view of the cover plate assembly showing the sleeve in the extended position and a ground wire attached to the sleeve.

Collar 74 is also provided with a plurality of embossed members 92 formed in an array as shown in FIGS. 5 and 10. The embossed members 92 are aligned parallel to the axis of the collar and positioned adjacent each corner above the ribs 86. The embossed members 92 as shown in cross section in FIG. 9 provide a surface area to reduce contact with the sleeve and inhibit binding of the sleeve.

Figure 7:
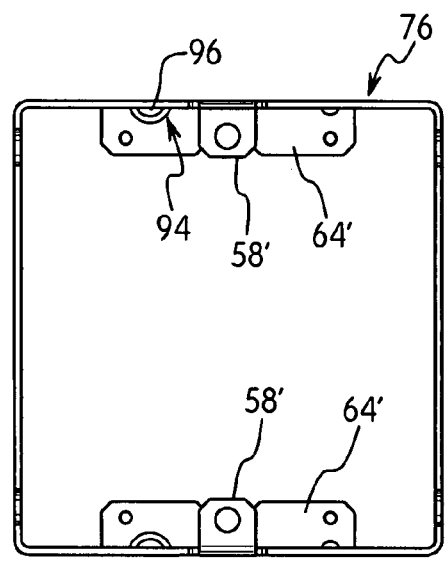
FIG. 7 is a bottom view of the sleeve showing the coupling member for the ground wire.
Figure 8:
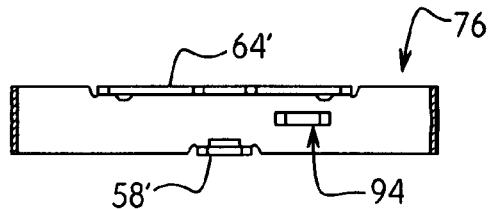
FIG. 8 is a cross sectional view of the sleeve showing the coupling member for the ground wire.
Figure 11:
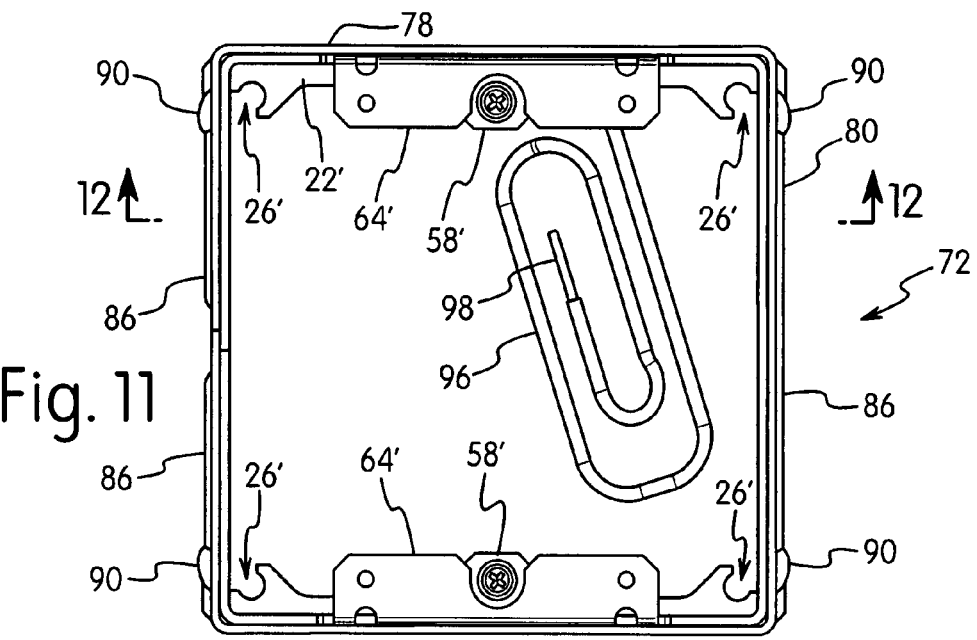
FIG. 11 is a top plan view of the sleeve and collar of FIG. 10.
Figure 12:
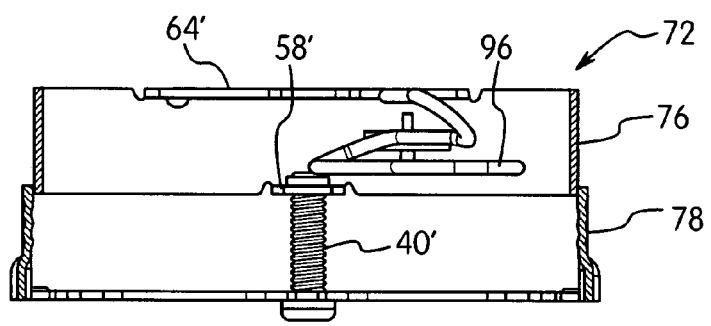
FIG. 12 is a cross sectional view of the collar and sleeve taken along line 12-12 of FIG. 11.

Sleeve 76 is similar to the sleeve of the previous embodiment except for a coupling member 94 in one side wall. As shown in FIGS. 7 and 8 coupling member 94 is cut or punched from the side wall to form an open loop-like member. The coupling member has opening 96 with a dimension to receive a ground wire 96. The ground wire is inserted through the coupling member and the coupling member is crimped or bent to capture the wire and secure to the sleeve. The ground wire 96 coupled to the sleeve provides grounding to the sleeve and the electrical device mounted to the sleeve. As shown in FIGS. 10-12, ground wire 96 has an end 98 that can be connected to the ground wire of the primary electrical wiring and/or to the electrical device mounted on the sleeve.

Another embodiment of the invention is shown in FIGS. 13-18. This embodiment is similar to the previous embodiments except for being constructed for use with a single electrical device while being mounted on a standard electrical box that is capable of supporting two electrical devices.

Figure 13:
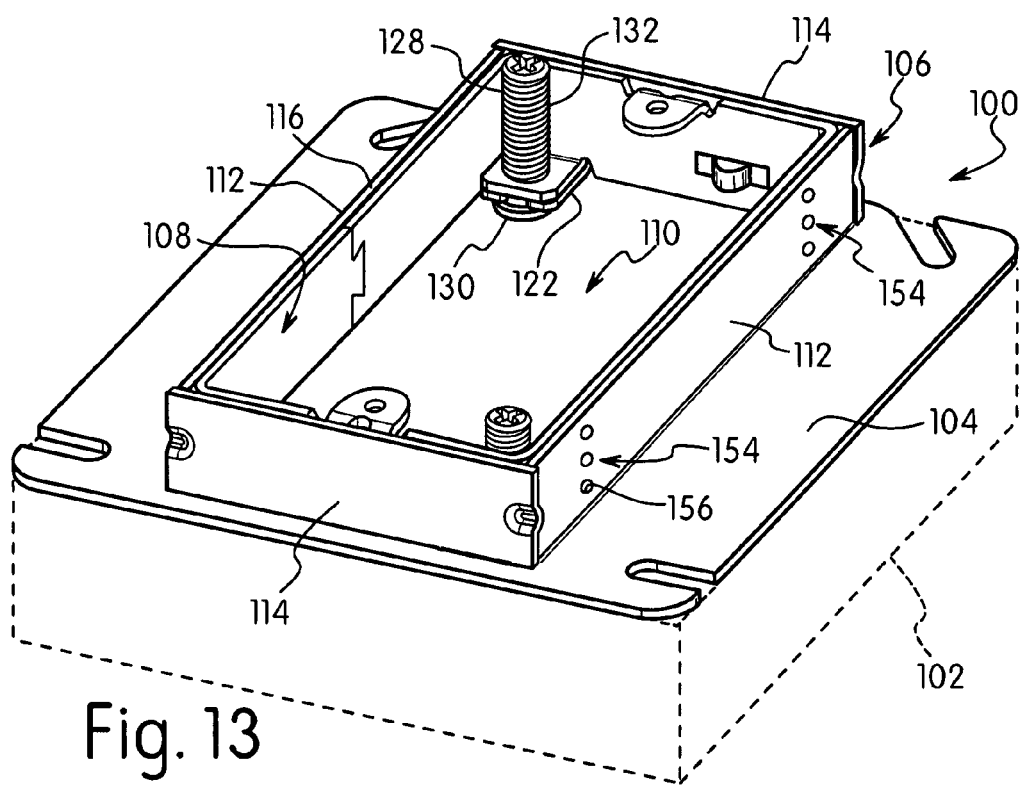
FIG. 13 is a perspective view of the cover plate assembly in another embodiment.
Figure 14:
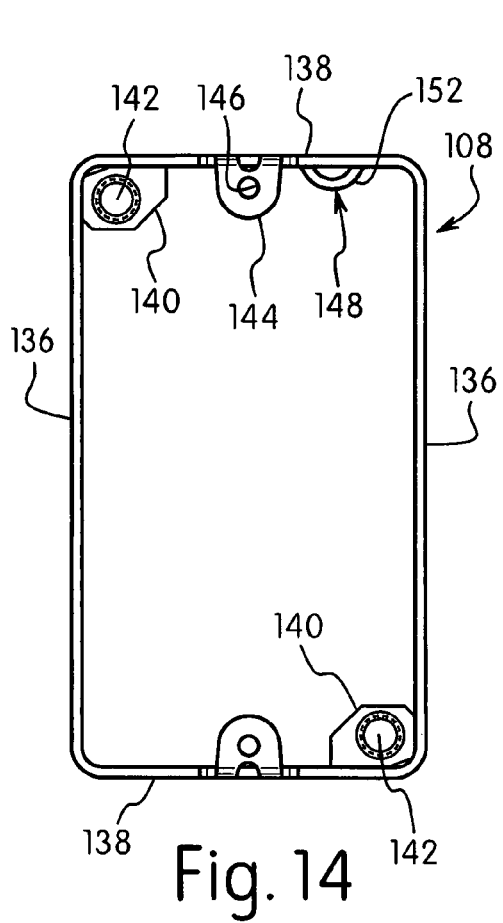
FIG. 14 is a top view of the sleeve of the embodiment of FIG. 13.
Figure 15:
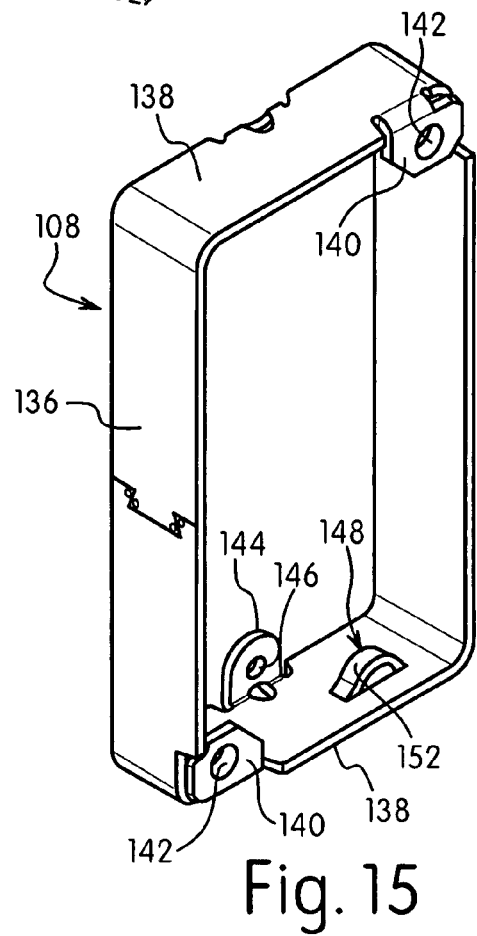
FIG. 15 is a perspective view of the sleeve of the embodiment of FIG. 13.

As shown in FIG. 13, the electrical box cover assembly 100 is attached to an electrical box 102 by screws or other fasteners as known in the art. Assembly 100 includes a base 104 having a collar 106 and a sleeve 108 that is axially movable within collar 106. Base 104 is formed with a central opening 110 having a dimension sufficient to receive an electrical device such as a switch or electrical receptacle. Collar 106 extends in an upward direction with respect to the plane of base 104. Collar 106 is formed from side walls 112 and end walls 114 to form a substantially rectangular shape.

Figure 16:
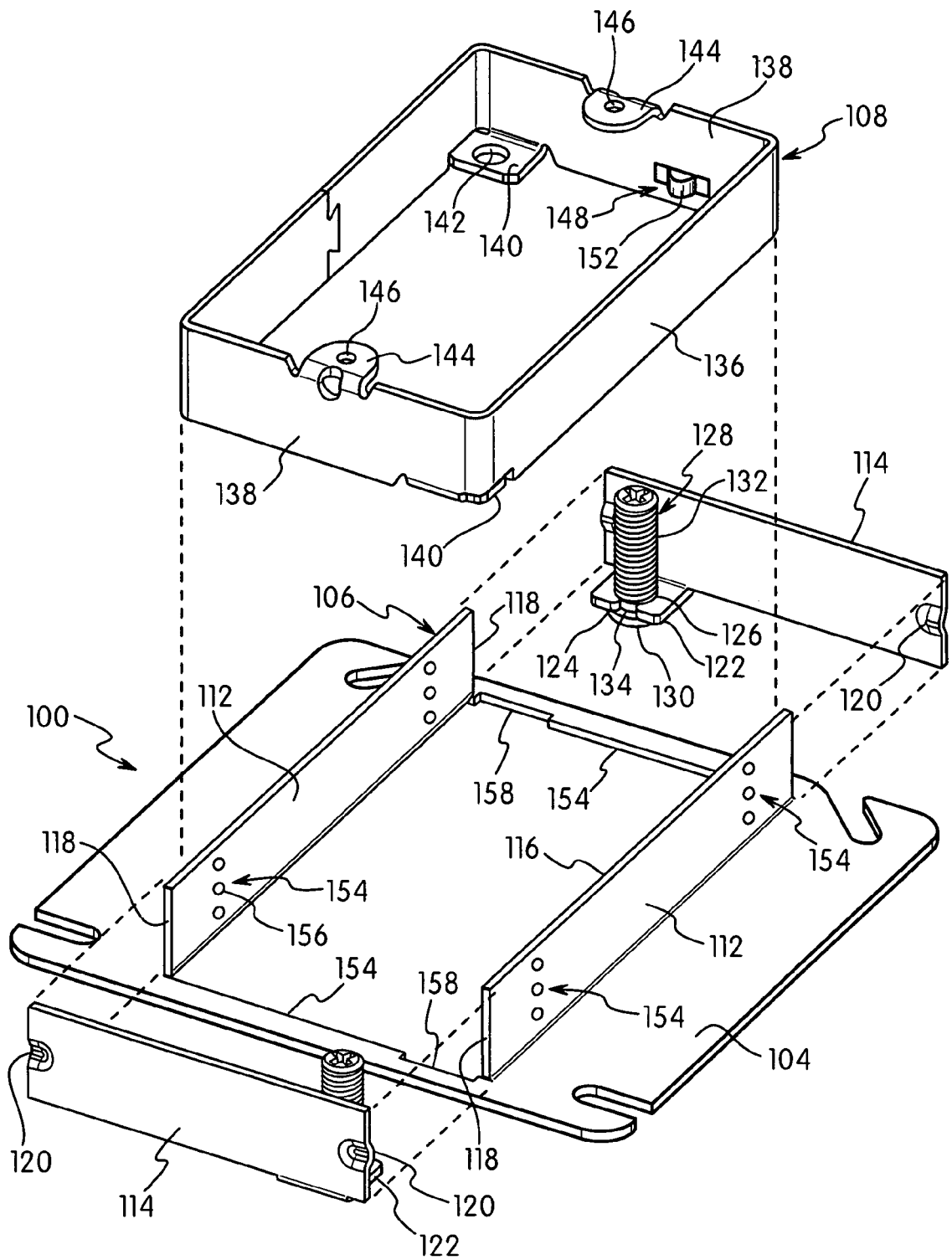
FIG. 16 is an exploded perspective view of the embodiment of FIG. 13 showing the sleeve and collar with the tabs for capturing the adjustment screw.
Figure 17:
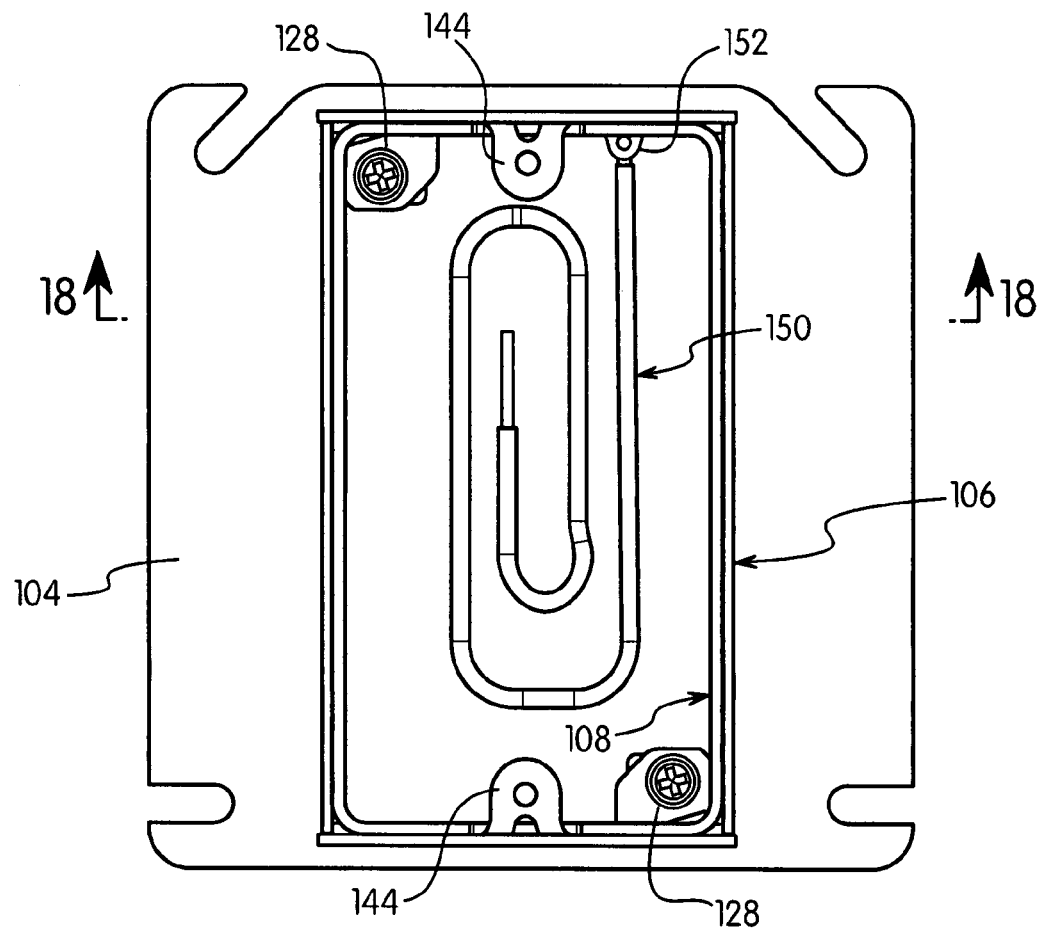
FIG. 17 is a top plan view of the cover plate assembly of FIG. 13 showing the ground wire attached to the sleeve.
Figure 18:
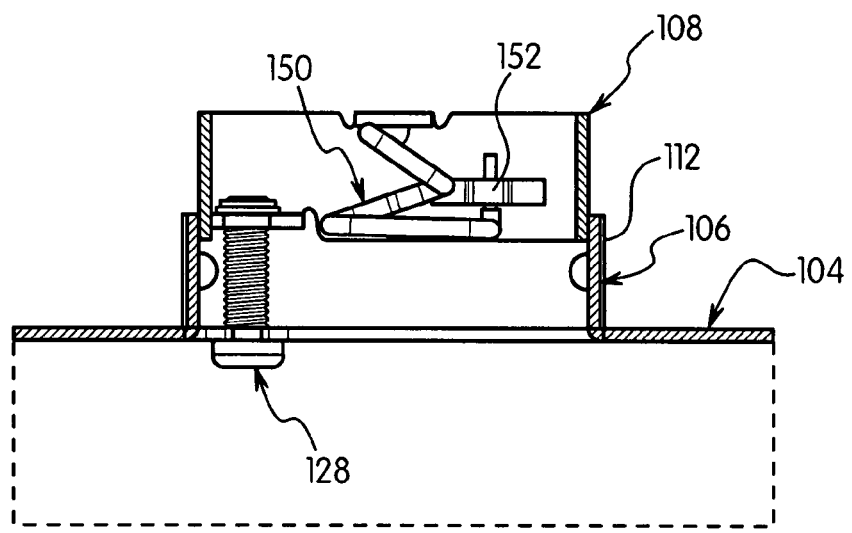
FIG. 18 is a cross-sectional end view of the cover plate assembly taken along line 18-18 of FIG. 17.

As shown in FIGS. 13 and 16 the side walls 112 are formed from the material that is removed to form central opening 110. Side walls 112 are integrally formed with base plate 104 and extend substantially perpendicular thereto. Side walls 112 have a top edge 116 and end faces 118. As shown in FIG. 16, side walls 112 have a length substantially equal to the length of central opening 110.

End walls 114 are formed as separate elements and attached to the respective end faces 118 of side walls 112. End walls 114 have a length to join to the end faces 118 of side walls 112 and a height substantially equal to the side walls 112. End walls 114 are attached to side walls 112 by a suitable coupling mechanism such as crimping to form a detent 120 or by spot welding. As shown in FIG. 13, end walls 114 are joined to side walls 112 to form collar 106 extending upwardly from the top face of base 104. In the embodiment shown, collar 106 has a substantially rectangular configuration. The height of collar 106 corresponds generally to the standard thickness of wall board or other wall construction material which is generally about one-half inch.

Referring to FIG. 16, end walls 114 are formed from a single sheet of metal or other material that are cut and bent to form the desired shape. End walls 114 include a tab 122 in close proximity to one end of the respective end wall 114. Tabs 122 extend perpendicular to the plane of end walls 114 in an inward direction with respect to the central opening. In a preferred embodiment tabs 122 are integrally formed with end walls 114 from a single piece of material. Tabs 122 are bent in a direction to extend inwardly with respect to central opening 110 as shown in FIG. 13. Tabs 122 include an elongated slot 124 with opposing concave recessed areas 126. Recessed areas 126 have a dimension to receive an end of an adjustment screw 128.

As shown in FIG. 16, adjustment screw 128 has a head 130, a threaded body 132, and an annular recess 134 at an end adjacent head 130. Annular recess 134 has a cylindrical center portion that has a dimension to fit within the concave recessed area 126 so that the adjustment screw is captured in the tab 122 while allowing rotation of the adjustment screw with respect to tab 122.

Sleeve 108 has a substantially rectangular configuration to slide within the central opening 110 and within collar 106. Sleeve 108 has a pair of opposite side walls 136 and opposite end walls 138 joined to the ends of side walls 136. In one embodiment, sleeve 108 is formed of metal or other sheet material and is folded from a blank so that the side walls and end walls are integrally formed together. As shown in FIG. 13, sleeve 108 has a height substantially the same as the height of collar 106 and is able to slide from a retracted position shown in FIG. 13 to an extended position shown in FIG. 18. In the retracted position shown in FIG. 13, a top edge of sleeve 108 is substantially aligned with top edge 116 of collar 106 while a bottom edge of sleeve abuts tab 122 in the retracted position.

Sleeve 108 is formed with inwardly extending tabs 140 at opposite corners along the bottom edge of sleeve 108. Tabs 140 include a threaded hole 142 to receive the adjustment screw 128. In the embodiment illustrated, tabs 140 extend from side walls 138. In alternative embodiments, tabs 140 can be integrally formed and extend from side walls 136. Tabs 140 are positioned to overlie the respective tab 122 so that adjustment screw 128 is aligned with the slot in tab 122 and threaded hole 142 in tab 140 as shown in FIG. 13.

End wall 138 of sleeve 108 includes mounting flanges 144 extending from the top edge. Mounting flanges 144 are positioned on opposite end walls 138 and include a threaded aperture 146 for mounting an electrical device such as a switch or duplex receptacle. As shown in FIGS. 13 and 16, one end wall 138 includes a coupling member 148 for coupling a ground wire 150 or pigtail to sleeve 108. Coupling member 148 is cut or punched from the side wall to define a band 152 with an opening to receive the end of the ground wire. In use, the end of the ground wire 150 is inserted into the opening and the band 152 is crimped to capture the ground wire thereby making a positive ground connection with the sleeve and the electrical device mounted on the sleeve. Typically, ground wire 150 is connected to the ground wire of the electrical cable to properly ground the sleeve and the electrical device mounted on the sleeve 108.

Referring to FIG. 16, side walls 112 of collar 106 are provide with an embossed area 154 to reduce the surface area of the inner surface of collar 112 thereby reducing the friction with the sleeve 108 and reducing binding of the sleeve 112 with the collar 106. In this embodiment the embossed area 154 is an array of embossed members 156 extending inwardly toward the sleeve.

As shown in FIG. 16, central opening 110 is defined by edges 154 which have a recess 158 with a dimension for receiving tab 122 of end walls 114 so that tab 122 does not extend into or obstruct central opening 110. Recess 158 preferably has a depth equal to the thickness of the tab 122. In this manner, end walls 114 contact the top surface of base 104. Adjustment screws 128 are threaded into the respective threaded hole 142 of tabs 140 and the center portion of the annular recess of threaded body 132 is positioned within slot 124 as shown in FIG. 3. The portions of tab 122 defining slot 124 can be pinched or compressed toward each other to capture adjustment screw 128 to prevent axial movement of adjustment screw 128 with respect to tab 122 while allowing rotation of the adjustment screw.

In use, electrical box 102 is mounted to a wall stud or other support structure and positioned so that the electrical device is appropriately positioned with respect to the outer surface of the wall structure. In some construction, and particularly remodeling construction, the position of the wall stud or support structure limits the location of the electrical box so that the electrical box is recessed within the wall. In this situation, adjustment screws 128 are rotated to extend sleeve 104 outwardly until the top edge of the sleeve 104 is substantially flush with the outer surface of the wall and the electrical device mounted to the sleeve 104 is readily accessible. Suitable wall material such as plaster can be applied around the sleeve 104 and collar 106 to finish the wall surface without interfering with the electrical box or the electrical device mounted to the sleeve 104. Thus, the sleeve 104 and collar can function as a mud ring for the electrical box.

While various embodiments have been chosen to illustrate the invention, it will be understood by those skilled in the art that various changes and modifications can be made by one of ordinary skill in the art without departing from the spirit and scope of the invention as defined in the appended claims.

What is claimed is:

1. An adjustable electrical box cover plate for coupling to an electrical box, said cover plate comprising:
   a base having an outer face, and an inner face, said base being adapted for coupling to said electrical box;
   a collar defining a central opening having a dimension to receive an electrical device and extending axially from said outer face of said base, said collar having at least two tabs at a bottom edge thereof extending inwardly into said central opening, said tab having an aperture therein;
   a sleeve received in said collar and being movable axially within said collar, said sleeve having at least two tabs at a bottom edge with a threaded hole therein that are aligned with a respective tab of said collar, said sleeve having a side wall with a coupling member for receiving a ground wire; and
   a threaded screw received in each said threaded hole of said tab of said sleeve, and said screw having an end rotatably coupled with and axially fixed with respect to said tabs of said collar, wherein rotation of said screw adjusts said sleeve axially with respect to said collar.

2. The cover plate of claim 1, wherein
   said collar includes first and second opposite side walls integrally formed with said base, third and fourth side walls separately formed from said first and second side walls, said third and fourth side walls having opposite ends coupled to respective opposite ends of said first and second side walls, and having a longitudinal bottom edge contacting side edges of said central opening, and where said tab extends inwardly from said bottom edge of said third and fourth side walls.

3. The cover plate of claim 2, wherein said collar has an axial length substantially equal to an axial length of said sleeve.

4. The cover plate of claim 2, wherein
   said sleeve is adjustable between a first position where a bottom edge of said sleeve is substantially even with a bottom edge of said collar and an extended position where said top edge of said sleeve is spaced outwardly from a top edge of said collar.

5. The cover plate of claim 1, wherein said coupling member for receiving the ground wire comprises a bendable member for crimping over the ground wire.

6. The cover plate of claim 1, wherein said coupling member for receiving the ground wire comprises a band cut from said sleeve to define an opening having a dimension to receive the ground wire, and where said band is bendable to secure the ground wire to said sleeve.

7. The cover plate of claim 1, wherein said aperture in said tab of said collar has an open side defining a slot with a concave surface therein and wherein said threaded screw has a notch received in said slot.

8. The cover plate of claim 1, wherein said base is integrally formed with said collar and extends inwardly from said side wall with respect to said central opening, and where said tab on said collar is integrally formed with said base.

9. The cover plate of claim 1, wherein said base extends outwardly from said collar.

10. The cover plate of claim 1, wherein said base comprises a first base plate extending inwardly from a first side of said collar and a second base plate extending inwardly from an opposite second side of said collar, each said first and second base plates having a mounting aperture for receiving a mounting screw for coupling said base to said electrical box, and where said tabs are integrally formed with a respective base plate.

11. The cover plate of claim 10, wherein
said first and second base plates have a length at least equal to a length of said first and second side walls, and where said first and second base plates include a mounting aperture at each longitudinal end of said base plates, and where said tabs are positioned between said mounting aperture of the respective base plate.

12. The cover assembly of claim 1, wherein
said coupling member for receiving said ground wire is on an inner face of said sleeve and is spaced from said tabs on said sleeve.

13. An electrical box cover plate comprising:
a collar having a base with at least one first aperture for receiving a fastener for coupling said collar and base to an electrical box and a side wall extending from an outer periphery of said base substantially perpendicular to said base, said base having a second aperture for capturing a threaded screw to limit axial movement of said screw to said base, said collar defining a central opening and where said base extends into said central opening; and
a sleeve received in said collar, said sleeve having a bottom edge and a top edge, first and second tabs extending inward from a respective portion of said bottom edge and having a threaded aperture to receive the screw, and first and second mounting flanges extending inwardly from said top edge for mounting an electrical device.

14. The cover plate of claim 13, wherein
said collar has first and second opposite side walls, and said base comprises a first base plate integrally formed with said first side wall and a second base plate integrally formed with said second side wall, said first and second base plates having a length substantially equal to the respective side wall.

15. The cover plate of claim 14, wherein
said first and second base plates have a first and second end section and a middle section between said first and second ends, said aperture for capturing the threaded screw being positioned in said middle section, said first and second ends including an opening for receiving a fastener for coupling said cover plate to an electrical box, and where said mounting flanges of said collar overlie said first and second base plates.

16. The cover plate of claim 14, wherein
said mounting flanges overlie said threaded aperture in said tabs of said sleeve, and where said mounting flanges have an opening aligned with said threaded aperture in said tabs and have a dimension to allow a tool to pass through to engage said threaded screws.

17. The cover plate of claim 16, wherein said mounting flanges have threaded mounting holes on opposite sides of said opening for mounting an electrical device.

18. The cover plate of claim 14, wherein said screws have a threaded body with a first end having an enlarged head and an annular recess adjacent said head for mating with said aperture in said base, said screws having a second end opposite said first end, said first and second ends having a recess for mating with a tool for rotating said screws.

19. The cover plate of claim 13, wherein said collar has an axial length substantially equal to an axial length of said sleeve.

20. The cover plate of claim 13, wherein said sleeve is movable between a first position where said bottom edge of said sleeve contacts said base on said collar to an extended second position where said bottom edge of said sleeve is spaced from said base.

21. The cover plate of claim 13, wherein said sleeve has an inner face with a coupling member for coupling to a ground wire.

22. The cover plate of claim 21, wherein said coupling member is a band integrally formed with said sleeve to define an opening to receive said ground wire, and where said band is bendable to crimp and capture the ground wire.

23. The cover plate of claim 13, wherein said collar has an embossed area extending out of the plane of the side wall.

24. The cover plate of claim 13, wherein said side wall of said collar includes an array of embossed areas to define guide member for said sleeve.

25. The cover plate of claim 13, wherein said side wall of said collar has an embossed area to define a recess on an inner surface of said side wall.

26. The cover plate of claim 25, wherein said embossed area has a length substantially equal to a length of said side wall.

27. The cover plate of claim 25, wherein said embossed area is formed at the bottom edge of the side wall to form an outwardly extending ridge.

28. The cover plate of claim 27, wherein said ridge has a longitudinal end with outwardly extending projections.

29. An electrical box assembly comprising an electrical box having an open top end and an inner cavity, and an adjustable cover plate coupled to the electrical box, wherein the adjustable cover plate comprises:
a collar having a base extending inwardly from a bottom edge of said collar and having at least one first aperture for receiving a mounting screw for coupling said base to said electrical box, said base having a second aperture for capturing a threaded screw, and
a movable sleeve axially received in said collar, said sleeve having a bottom edge and top edge, first and second tabs extending inwardly from opposite sides of said bottom edge, said tabs having a threaded aperture to receive said screw, and first and second mounting flanges extending inwardly from said top edge for mounting an electrical device.

30. The electrical box of claim 29, wherein
said collar has first and second opposite side walls, and said base comprises a first base plate integrally formed with said first side wall and a second base plate integrally formed with said second side wall, said first and second base plates having a length substantially equal to the respective side wall and extend inwardly with respect to said collar.

31. The electrical box of claim 30, wherein
said first and second base plates have a first and second end section and a middle section between said first and second ends, said tabs being integrally formed with said base plates, said aperture for capturing the threaded screw is positioned in said middle section, said first and second ends including an opening for receiving a fastener for coupling said cover plate to an electrical box, and where said mounting flanges of said collar overlie said first and second base plates.

32. The electrical box assembly of claim 31, wherein said mounting flanges have an opening aligned with said threaded aperture in said tabs and have a dimension to allow a tool to pass through to engage said threaded screw.

33. The electrical box assembly of claim 29, wherein said screws have a threaded body with a first end having an enlarged head and an annular recess adjacent said head for mating with said aperture in said base, said screws having a second end opposite said first end received in said aperture of said tab, said first and second ends having a recess for mating with a tool for rotating said screws, and where said sleeve is movable between a first position where said bottom edge of said sleeve contacts said base on said collar to a second extended second position where said bottom edge of said sleeve is spaced from said base.

34. The electrical box assembly of claim 29, wherein said sleeve includes a band integrally formed with said sleeve to define an opening to receive a ground wire, and where said band is bendable to crimp and capture the ground wire.

35. The electrical box assembly of claim 29, wherein said collar has an array of embossed areas extending out of the plane of the side wall to define guide members for said sleeve.

36. The electrical box assembly of claim 35, wherein said embossed area is formed at the bottom edge of the side wall to form an outwardly extending ridge.

* * * * *

(12) EX PARTE REEXAMINATION CERTIFICATE (8287th)
United States Patent
Johnson et al.

(10) Number: US 7,531,743 C1
(45) Certificate Issued: May 31, 2011

(54) ELECTRICAL BOX MOUNTING PLATE WITH ADJUSTABLE RING

(75) Inventors: Steven J. Johnson, Galien, MI (US); Krzysztof W. Korcz, Granger, IN (US)

(73) Assignee: Hubbell Incorporated, Orange, CT (US)

Reexamination Request:
No. 90/010,952, Apr. 16, 2010

Reexamination Certificate for:
Patent No.: 7,531,743
Issued: May 12, 2009
Appl. No.: 11/648,907
Filed: Jan. 3, 2007

(51) Int. Cl.
*H01H 9/02* (2006.01)

(52) U.S. Cl. .............................. 174/57; 174/53; 174/58; 174/66; 220/3.2; 220/3.3; 220/241

(58) Field of Classification Search ........................ None
See application file for complete search history.

(56) References Cited

U.S. PATENT DOCUMENTS

| | | |
|---|---|---|
| 3,195,600 A | 7/1965 | Middleton, Jr. |
| 3,777,796 A | 12/1973 | Takano |
| 3,955,701 A | 5/1976 | Fisch |
| 3,980,197 A | 9/1976 | Ware |
| 4,634,015 A | 1/1987 | Taylor |
| 4,890,384 A | 1/1990 | Shaffer |
| 5,012,043 A | 4/1991 | Seymour |
| 5,703,327 A | 12/1997 | Jorgensen |
| 6,800,806 B1 | 10/2004 | Grday |
| 6,820,760 B2 | 11/2004 | Wegner et al. |
| 6,994,585 B2 | 2/2006 | Benoit et al. |
| 7,312,396 B1 | 12/2007 | Gorman |

OTHER PUBLICATIONS

Chicago Nut & Bolt, [Online], 2003, Retrieved from the Internet on Apr. 23, 2009, [URL:http://www.boltsrus.com/parts.shtml].

*Primary Examiner* — Catherine S. Williams

(57) ABSTRACT

An electrical box assembly includes an adjustable electrical box cover. The cover includes a base having a central opening and a collar encircling the central opening. A sleeve slides through the collar and is adjusted by a plurality of adjustment screws. In one embodiment, the adjustment screws are positioned within the sleeve and the collar. The sleeve and collar have inwardly extending tabs to receive the adjustment screws allow adjustment of the sleeve with respect to the collar.

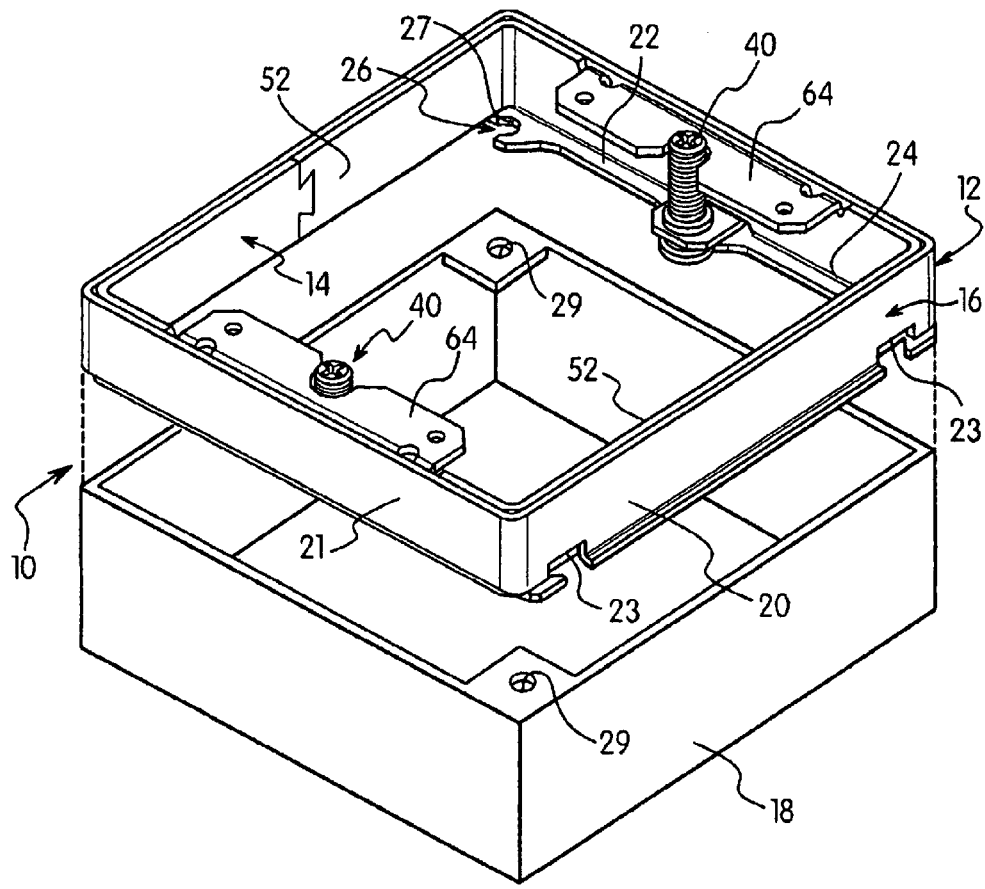

EX PARTE
REEXAMINATION CERTIFICATE
ISSUED UNDER 35 U.S.C. 307

THE PATENT IS HEREBY AMENDED AS
INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claim 32 is cancelled.

Claims 1-2, 7-8, 13-15, 18, 21, 23-25, 27, 29-31, 33-34 and 36 are determined to be patentable as amended.

Claims 3-6, 9-12, 16-17, 19-20, 22, 26, 28 and 35, dependent on an amended claim, are determined to be patentable.

New claims 37-42 are added and determined to be patentable.

1. An adjustable electrical box cover plate for coupling to an electrical box, said cover plate comprising:
    a base having an outer face, and an inner face, said base being adapted for coupling to said electrical box;
    a collar defining a central opening having a dimension to receive an electrical device and extending axially from said outer face of said base, said collar having [at least two tabs at a] *first and second side walls integrally formed with said base and third and fourth opposing side walls with a top edge and a bottom edge, each said third and fourth side walls having a tab integrally formed with said respective* bottom edge [thereof extending] *and bent* inwardly *to said bottom edge* into said central opening, *each* said tab having an aperture therein;
    a sleeve received in said collar and being movable axially within said collar, said sleeve having at least two tabs at a bottom edge with a threaded hole therein that are aligned with a respective tab of said collar, said sleeve having a side wall with a coupling member [for] receiving a ground wire *adapted for connecting to an electrical wiring device supported by said sleeve*; and
    a threaded screw received in each said threaded hole of said tab of said sleeve, and said *threaded* screw having an end rotatably coupled with and axially fixed *in said aperture* with respect to said tabs of said collar, wherein rotation of said *threaded* screw adjusts said sleeve axially with respect to said collar.

2. The cover plate of claim 1, wherein
    said [collar includes first and second opposite side walls integrally formed with said base,] third and fourth side walls *are* separately formed from said first and second side walls, said third and fourth side walls having opposite ends coupled to respective opposite ends of said first and second side walls, and having a longitudinal bottom edge contacting side edges of said central opening, and where said [tab extends] *tabs extend* inwardly from said bottom edge of said *respective* third and fourth side walls.

7. The cover plate of claim 1, wherein said aperture in *each* said tab of said collar has an open side defining a slot with a concave surface therein and wherein said threaded screw has a notch received in said slot.

8. The cover plate of claim 1, wherein said base is integrally formed with said collar and extends inwardly from said *third and fourth* side [wall] *walls* with respect to said central opening, and where said tab on said collar is integrally formed with said base.

13. An electrical box cover plate comprising:
    a collar having a base [with] *and a side wall, said base comprising a first base plate and a second base plate integrally formed with said side wall of said collar,* each base plate having at least one first aperture for receiving a fastener for coupling said [collar and base] *cover plate* to an electrical box[and a side wall extending from an outer periphery of said base substantially perpendicular to said base, said base having], a second aperture for capturing a threaded *adjustment* screw to limit axial movement of said *adjustment* screw to said base, said collar defining a central opening and where said *first* base [extends] *plate and second base plate extend* into said central opening *substantially perpendicular to said side wall of said collar*; and
    a sleeve received in said collar, said sleeve having a bottom edge and a top edge, first and second tabs extending inward from a respective portion of said bottom edge and having a threaded aperture to receive the *adjustment* screw, and first and second mounting flanges extending inwardly from said top edge for mounting an electrical device.

14. The cover plate of claim 13, wherein
    said collar has first and second opposite side walls, and said [base comprises a] first base plate *is* integrally formed with [said] *a* bottom edge *of a* first side wall *of said collar* and [a] *said* second base plate *is* integrally formed with [said] *a* bottom edge *of a* second side wall *of said collar*, said first and second base plates having a length substantially equal to the respective side wall.

15. The cover plate of claim 14, wherein
    said first and second base plates have a first and second end section and a middle section between said first and second ends, said aperature for capturing the threaded *adjustment* screw being positioned in said middle section, said first and second ends including an opening for receiving a fastener for coupling said cover plate to an electrical box, and where said mounting flanges of said [collar] *sleeve* overlie said first and second base plates.

18. The cover plate of claim 14, wherein said *adjustment* screws have a threaded body with a first end having an enlarged head and an annular recess adjacent said head for mating with said aperture in said base, said screws having a second end opposite said first end, said first and second ends having a recess for mating with a tool for rotating said screws.

21. The cover plate of claim 13, *further comprising a ground wire,* wherein said sleeve has an inner face with a coupling member [for coupling] *coupled* to [a] *said* ground wire *adapted for coupling with an electrical component mounted on said sleeve*.

23. The cover plate of claim [13] *14*, wherein said collar has an embossed area extending out of the plane of [the] *a third* side wall *of said collar to define a recess having a dimension to receive a head of the mounting screw*.

24. The cover plate of claim 13, wherein said [side wall of said] collar *has a side wall which* includes an array of embossed areas to define guide member for said sleeve.

25. The cover plate of claim 13, wherein [said side wall of] said collar has *a bottom edge with* an embossed area to define a recess on an inner surface of said side wall.

27. The cover plate of claim 25, wherein said embossed area is formed at the bottom edge of the side wall to form an outwardly extending ridge *with a dimension to receive a head of a screw for coupling said collar to the electrical box.*

29. An electrical box assembly comprising an electrical box having an open top end and an inner cavity, and an adjustable cover plate coupled to the electrical box, wherein the adjustable cover plate comprises:

a collar having a *first* base *plate and a second base plate* extending inwardly from a bottom edge of said collar[and], *each said first base plate and second base plate* having at least one first aperture for receiving a mounting screw for coupling said base to said electrical box, [said base having] *and* a second aperture [for] capturing a threaded screw, and a movable sleeve axially received in said collar, said sleeve having a bottom edge and top edge, first and second tabs extending inwardly from opposite sides of said bottom edge, said tabs having a threaded aperture to receive said *threaded* screw, said first and second mounting flanges extending inwardly from said top edge for mounting an electrical device, *said first and second mounting flanges having an opening aligned with a respective threaded aperture to allow a tool to engage the threaded screw.*

30. The electrical box of claim 29, wherein said collar has first and second opposite side walls, and said [base comprises a] first base plate *is* integrally formed with said first side wall and [a] *said* second base plate *is* integrally formed with said second side wall, said first and second base plates having a length substantially equal to the respective side wall[and extend inwardly with respect to said collar].

31. The electrical box of claim 30, wherein said first and second base plates have a first and second end section and a middle section between said first and second ends, [said tabs being integrally formed with said plates,] said *second* aperture for capturing the threaded screw is positioned in said middle section, said first and second ends including an opening for receiving a fastener for coupling said cover plate to an electrical box, and where said mounting flanges of said collar overlie said first and second base plates.

33. The electrical box assembly of claim 29, wherein said *threaded* screws have a threaded body with a first end having an enlarged head and an annular recess adjacent said head for mating with said *second* aperture in said *first* base *plate and second base plate*, said *threaded* screws having a second end opposite said first end received in said aperture of said tab, said first and second ends having a recess for mating with a tool for rotating said screws, and where said sleeve is movable between a first position where said bottom edge of said sleeve contacts said *first and second* base *plates* on said collar to a second extended second position where said bottom edge of said sleeve is spaced from said *first and second* base *plates.*

34. The electrical box assembly of claim 29, wherein said sleeve includes a band integrally formed with said sleeve to define an opening[to receive], a ground wire *coupled to said sleeve by said band*, and where said band is bendable to crimp and capture the ground wire.

36. The electrical box assembly of claim [35] *29*, wherein said *collar has* embossed [area is] *areas* formed at the bottom edge of the side wall to form an outwardly extending ridge *with a dimension to receive a head of the mounting screw for coupling said adjustable cover plate to the electrical box.*

*37. The adjustable electrical box of claim 1, wherein*

*said sleeve has first and second mounting flanges overlying said tabs on said collar and having a dimension for supporting an electrical device, each said flange having an opening aligned with said tabs to access said threaded screw.*

*38. The cover plate of claim 13, wherein said first and second mounting flanges overlie said threaded aperture in said first and second tabs and have an opening aligned with a respective aperture to access said adjustment screw.*

*39. The cover plate of claim 15, wherein said collar has third and fourth opposite side walls extending between said first and second side walls, said third and fourth side walls having an open slot at a bottom edge thereof at said first and second ends of said base plates and having a dimension for receiving a head of said fastener for coupling said mounting plate to the electrical box.*

*40. The cover plate of claim 15, wherein said openings in said first and second ends of said base plates are a slot for receiving said fastener and having an open end facing said third and fourth side walls of said collar, respectively, said third and fourth side walls having an open area at a bottom edge and positioned to receive a head of said fastener to enable said fastener to slide into said slot.*

*41. The cover plate of claim 40, wherein said open area is defined by an open slot in said third and fourth side walls.*

*42. The cover plate of claim 40, wherein said open area is defined by an embossed area protruding outwardly from said respective side wall to define a recessed area on an inner face of said third and fourth side walls.*

\* \* \* \* \*